United States Patent
Müller et al.

(10) Patent No.: US 11,237,134 B2
(45) Date of Patent: Feb. 1, 2022

(54) ACOUSTIC EMISSION SENSOR HAVING AT LEAST TWO MECHANICAL COUPLING ELEMENTS

(71) Applicant: FOS4X GMBH, Munich (DE)

(72) Inventors: Mathias Müller, Gröbenzell (DE); Markus Schmid, Munich (DE); Sascha Kienitz, Munich (DE)

(73) Assignee: FOS4X GMBH, Munich (DE)

( * ) Notice: Subject to any disclaimer, the term of this patent is extended or adjusted under 35 U.S.C. 154(b) by 194 days.

(21) Appl. No.: 16/475,057

(22) PCT Filed: Dec. 28, 2017

(86) PCT No.: PCT/EP2017/084737
§ 371 (c)(1),
(2) Date: Jun. 28, 2019

(87) PCT Pub. No.: WO2018/122327
PCT Pub. Date: Jul. 5, 2018

(65) Prior Publication Data
US 2020/0300816 A1    Sep. 24, 2020

(30) Foreign Application Priority Data
Dec. 28, 2016  (DE) .......................... 102016125799.0

(51) Int. Cl.
*G01N 29/14*  (2006.01)
*G01H 9/00*  (2006.01)
*G02B 6/32*  (2006.01)

(52) U.S. Cl.
CPC ............. *G01N 29/14* (2013.01); *G01H 9/004* (2013.01); *G02B 6/32* (2013.01)

(58) Field of Classification Search
CPC ........... G01N 29/14; G01H 9/004; G02B 6/32
(Continued)

(56) References Cited

U.S. PATENT DOCUMENTS

| 4,530,078 A * | 7/1985 | Lagakos ................ G01H 9/004 367/149 |
| 5,533,383 A * | 7/1996 | Greene ................... G01M 3/24 73/40.5 A |

(Continued)

FOREIGN PATENT DOCUMENTS

| CN | 102997050 A | 3/2013 |
| DE | 102010061605 A1 | 6/2012 |

(Continued)

OTHER PUBLICATIONS

Li, Min; Zhao, Hong; Zhang, Jian.: Fiber fabry-perot sensors based acoustic detection of partial discharges in power transformers. In: Properties and applications of Dielectric Materials, 2006. 8th International Conference on. IEEE, 2006. s.254-257.

(Continued)

*Primary Examiner* — Tarun Sinha
(74) *Attorney, Agent, or Firm* — Moser Taboada

(57) ABSTRACT

The invention relates to an acoustic emission sensor (100). The acoustic emission sensor comprises an optical resonator (10) having a sensor region (11) configured for reflective operation; an optical waveguide (20) which is optically coupled to the optical resonator (10); a light source (31) which is optically coupled to the optical waveguide (20) to apply light to the optical waveguide (20); and a detection device (32) which is optically coupled to the optical waveguide (20) to detect light from the optical resonator (10). The sensor region (11) of the optical resonator (10) comprises a coupling device (50) for mechanically coupling to a solid measurement object (200). The coupling device (50) comprises a first coupling element (51) for transmitting an acoustic emission signal between the sensor region (11) and the solid measurement object (200), and at least one second coupling element (52). The second coupling element (52) is configured to position the coupling device (50) on the solid (Continued)

measurement object (200), and/or the second coupling element (52) acts as a filter for the acoustic emission signal.

12 Claims, 1 Drawing Sheet

(58) Field of Classification Search
USPC .......................................................... 73/587
See application file for complete search history.

(56) References Cited

U.S. PATENT DOCUMENTS

| | | |
|---|---|---|
| 2004/0141420 A1 | 7/2004 | Hardage et al. |
| 2009/0226128 A1 | 9/2009 | Donlagic et al. |
| 2016/0245687 A1 | 8/2016 | Digonnet et al. |

FOREIGN PATENT DOCUMENTS

| | | | |
|---|---|---|---|
| JP | 2003130722 A | | 5/2003 |
| JP | 2003337063 A | | 11/2003 |
| JP | 4471862 B2 | | 6/2010 |
| JP | 2013253831 A | * | 12/2013 |

OTHER PUBLICATIONS

International Search Report and written opinion report for patent application No. PCT/EP2017/084737, dated May 4, 2018.

\* cited by examiner

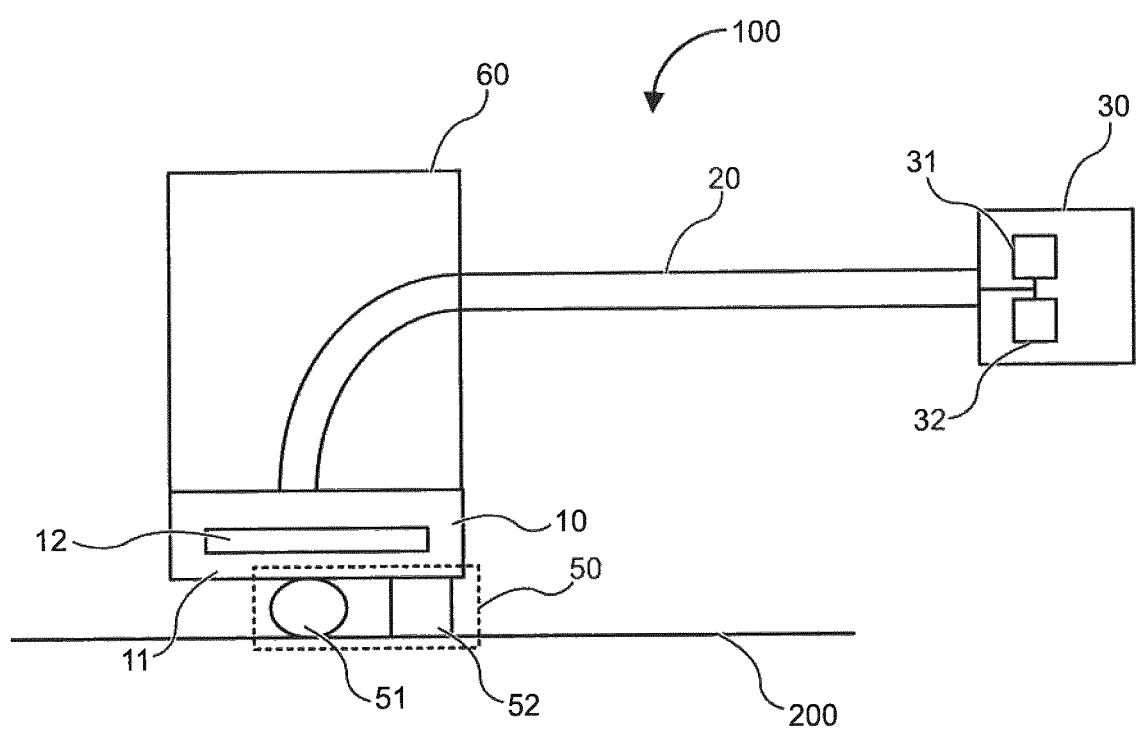

ACOUSTIC EMISSION SENSOR HAVING AT LEAST TWO MECHANICAL COUPLING ELEMENTS

TECHNICAL FIELD

The disclosure relates to an acoustic emission sensor. Acoustic emission sensors are used for structure-borne sound measurements, for example, structure-borne sound measurements on solid measurement objects.

STATE OF THE ART

From U.S. Pat. No. 5,191,796 A, an acoustic emission sensor is known which includes a piezoelectric element. Piezoelectric detection requires the conventional acoustic emission sensor to be electrically connected, which may be undesired in certain cases of application such as, for example, in potentially explosive environments, in chemically corrosive media or at high ambient temperatures.

U.S. Pat. No. 6,289,143 B1 describes a fiber-optic acoustic emission sensor for vibration detection in a harsh environment. The conventional acoustic emission sensor includes two single-mode optical waveguide fibers, the rear end faces of which are each arranged facing each other in a hollow body, so that light transmitted through one of the optical waveguide fibers in the direction of the rear end face, is partially reflected at the rear end face of this fiber and at the end face of the other fiber. The known structure of an acoustic emission sensor impedes direct mechanical coupling to a solid measurement object.

SUMMARY OF THE INVENTION

The present disclosure provides an acoustic emission sensor according to claim 1.

According to one aspect, the acoustic emission sensor includes an optical resonator having a sensor region configured for reflective operation; an optical waveguide which is optically coupled to the optical resonator; a light source which is optically coupled to the optical waveguide to apply light to the optical waveguide; and a detection device which is optically coupled to the optical waveguide to detect light from the optical resonator, wherein the sensor region of the optical resonator includes a coupling device for mechanically coupling to a solid measurement object, wherein the coupling device includes a first coupling element for transmitting an acoustic emission signal between the sensor region and the solid measurement object, and at least one second coupling element, wherein the second coupling element is configured to position the coupling device on the solid measurement object, and/or wherein the second coupling element acts as a filter for the acoustic emission signal.

According to a further aspect, an acoustic emission sensor described herein is used to perform a measurement on a measurement object in a potentially explosive environment and/or to perform a measurement on a measurement object in an environment having a temperature in the range between −40° C. and +100° C. and/or to perform a measurement on a measurement object in a chemically corrosive environment.

According to a further aspect, a plurality of acoustic emission sensors described herein is used to perform a measurement on a plurality of measurement points on a solid measurement object for performing a measurement on the measurement object, wherein the measurement includes determining a location of a sound event.

Further aspects and features will result, for example, from the features of the dependent claims.

BRIEF DESCRIPTION OF THE DRAWINGS

Embodiments of the invention are illustrated in the drawings and explained in more detail in the following description. Shown are in the drawings:

FIG. 1 a schematic representation of an acoustic emission sensor according to one embodiment.

WAYS FOR CARRYING OUT THE INVENTION

Hereinafter, embodiments will be explained in more detail. The drawings serve the purpose of depicting one or more examples of embodiments.

Embodiments described herein relate, inter alia, to an acoustic emission sensor. FIG. 1 shows an acoustic emission sensor 100 according to one embodiment in a schematic view.

An acoustic emission sensor 100 such as described herein is used, for example, to detect the sound event when plastic deformations, cracks and/or damages develop in or on a measurement object 200. In particular when the measurement object 200 is under continuous stress, such defects may grow into larger damages which might finally result in the measurement object failing.

The acoustic emission sensor 100 includes an optical resonator 10. The optical resonator has a sensor region 11 and is configured for reflective operation. During the reflective operation, the light exits on the same side of the optical resonator 10, where it has entered the optical resonator 10.

The acoustic emission sensor 100 furthermore includes an optical waveguide 20 which is optically coupled to the optical resonator 10 and serves to introduce light into the optical resonator 10 as well as to lead out light from the optical resonator 10.

Moreover, the acoustic emission sensor 100 includes a light source 31 which is optically coupled to the optical waveguide 20 and is configured to apply light to the optical waveguide 20. The acoustic emission sensor 100 further includes a detection device 32 which is optically coupled to the optical waveguide 20 and is configured to detect light from the optical resonator 10.

In the embodiment represented in FIG. 1, the light source 31 and the detection device 32 are combined in a test facility 30; but the light source 31 and the detection device 32 may also be provided separately. The light source 31 and the detection device 32 are coupled to the same end of the optical waveguide 20 via an appropriate beam splitter.

Light from the light source 31 coupled into the optical resonator 10 is suitable in its wavelength and intensity to generate optical resonance in the optical resonator 10. A mechanical deflection of the sensor region 11 of the optical resonator due to a sound event (acoustic emission event or structure-borne sound event) leads to a change in the resonance characteristics which are detectable in the light which exits the optical resonator 10 and is guided to the detection device 32 through the optical waveguide 20. The sensor region 11 of the optical resonator typically is a diaphragm of the optical resonator, the deflection of which diaphragm leads to a change in the resonance characteristics of the optical resonator 10. The detection device 32 is configured to detect such a change and to make it accessible for evaluation.

The optical resonator 10 is an extrinsic resonator having an open or a closed cavity. An open cavity has the characteristic that a variable ambient pressure acting upon the sensor region 11 will not lead to an offset value which would have to be taken into account in the evaluation of the resonance characteristics of the optical resonator 10.

The sensor region 11 of the optical resonator 10 includes a coupling device 50 for mechanically coupling to a solid measurement object 200. A solid measurement object 200, for example, is a mechanical structure, typically a mechanical structure exposed to dynamic loads.

The coupling device 50 includes a first coupling element 51 and at least one second coupling element 52. The first coupling element 51 is configured to form or establish a first connection to the solid measurement object 200. Moreover, the first coupling element 51 is configured to transmit an acoustic emission signal or structure-borne sound signal, which propagates in the solid measurement object 200 to the coupling position to the first coupling element 51, to the sensor region 11. The first coupling element 51 serves for signal transmission between the solid measurement object 200 and the sensor region 11.

The at least one second coupling element 52 is configured to form or establish a second connection to the solid measurement object 200. The at least one second coupling element 52 serves to position the coupling device 50 on the solid measurement object 200. Alternatively, or in addition, the second coupling element 52 serves as a filter for the acoustic emission signal or structure-borne sound signal, typically as a low-pass filter.

The first connection and the second connection define different degrees of freedom in the coupling between the respective coupling element 51, 52 and the solid measurement object 200. By way of example, the first connection only defines a translational degree of freedom for transmitting an acoustic event perpendicular to the sensor region 11 and/or perpendicular to the surface of the solid measurement object 200 on which the coupling should take place. By way of example, the second connection defines the translational degrees of freedom in parallel to the sensor region 11 and/or in parallel to the surface of the solid measurement object 200.

The at least one second coupling element 52 typically is arranged relative to the first coupling element 51 such that the coupling between the sensor region 11 and the solid measurement object 200 is performed in a mechanical parallel connection of the first coupling element 51 and the second coupling element 52. In a mechanical parallel connection, the first coupling element 51 acts mechanically in parallel to the second coupling element 52. For this purpose, the at least one second coupling element 52 is arranged next to the first coupling element 51, for example.

Typically, the first coupling element 51 exhibits higher rigidity than the second coupling element 52. The first coupling element 51 is formed such that a very strong or rigid or rather direct coupling to a surface of the solid measurement object 200 is enabled. The sensor region 11 of the optical resonator 10 may thus detect the structure-borne sound waves in the measurement object 200, which occur, for example, by occurring or developing micro cracks in the measurement objects 200 as a structure to be monitored.

In embodiments, the relationship of the shear rigidity of the first coupling element 51 to the shear rigidity of the second coupling element 52 at a temperature of 20° C. is more than 50,000, typically more than 80,000, or more than 100,000. At least in the compression direction between the optical resonator 10 and the measurement object 200, the first coupling element 51 is much more rigid than the second coupling element 52. The first coupling element 51 is formed of glass, for example. The second coupling element 52 is formed of a rubber material, for example.

The second coupling element 52 may be glued to the sensor region 11. It may also be glued to the surface of the measurement object 200, or, if a housing is present, to the surface of the housing. The second coupling element 52, which is very flexible in relation to the first coupling element 51, may thereby create a direct and reliable contact between the measurement object 200 and the sensor region 11 with interposition of the first coupling element 51, so that structure-borne sound signals in the measurement object may be detected very accurately by the optical resonator 10.

The first coupling element 51 typically exhibits a small contact surface for the contact with the solid measurement object 200. In other words: in embodiments, the first coupling element 51 has a shape forming an approximately point-like contact area to the sensor region 11 and/or the solid measurement object 200. The acoustic emission sensor 100 may thus be connected almost point-like to the solid measurement object 200, and a measurement of a sound event may be performed almost point by point.

Examples of a shape for an approximately point-like contact area are a spherical shape, a spheroid shape, a cylinder shape, a square shape. In the sectional view in FIG. 1, the rigid coupling element 51 is formed in a spheroid shape. An appropriate design enables a particularly rigid coupling of the optical resonator 10 to the measurement object 200.

As compared to the first coupling element 51, the second coupling element 52 is formed to be extremely flexible or soft. The second coupling element 52 functions as a low-pass filter and substantially does not transmit any structure-borne sound waves in a higher frequency range. By means of the second coupling element 52, the sensor surface of the optical resonator 10 may be held securely and reliably, wherein the direct or point-like character of the measurement is not changed substantially by the second coupling element 52.

Apart from directly coupling to an upper surface of the measurement object 200, it is also possible for the coupling device 50 to serve for an indirect mechanical coupling of the sensor region 11 to the measurement object 200. For example, a housing is provided surrounding at least the optical resonator 10 and the coupling device 50, and to which housing the first coupling element 51 and the second coupling element 52 are coupled. A surface of the housing extending substantially in parallel to the surface of the sensor region 11 of the optical resonator, then may in turn be rigidly coupled to a surface of the measurement object 200. Then, as well, measurement may be performed in an area of a comparatively small spatial extension, wherein the sensor region of the optical resonator 10 is held securely and reliably by the second coupling element 52.

The measurement principle of the acoustic emission sensor 100 described herein is purely optical. Thereby, long signal transmission distances are possible such as those occurring e.g. in using the acoustic emission sensor 100 on a solid measurement object 200 that is spatially extensive or spaced far away from the detection device 32. The size and weight of the acoustic emission sensor 100 described herein are comparatively low, which may result in cost and handling advantages. The acoustic emission sensor 100 described herein is very overload-proof at a simultaneously high sensitivity and high natural frequency, which yields a large field of application of the acoustic emission sensor 100. An extrinsic acoustic emission sensor 100 described herein can be coupled mechanically to the measurement object 200. It thus detects structure-borne sound waves over a high bandwidth and with high sensitivity.

In embodiments, the optical resonator 10 includes a Fabry Perot resonator. Light from the optical waveguide 20 enters into a cavity of the Fabry Perot resonator and radiates through the cavity. The cavity may be formed to be open or closed. The light is reflected at the sensor region 11, typically a sensor diaphragm. The side where the light enters the cavity 12 from the optical waveguide 20, and the side of the sensor region of the cavity 12 thus form an optical Fabry Pérot resonator. Parts of the light that has possibly passed through the cavity 12 a number of times are in turn reflected into the optical waveguide 20 in the direction of the detection device 32.

In the reflected light, an interference spectrum is formed which features minima and maxima which can be detected by means of the detection device 32. The position of the minima and maxima depends on the length of the cavity 12. The length of the cavity 12 is changed by a deflection of the sensor region 11. A deflection of the sensor region 11 takes place in the acoustic emission sensor 100 which is coupled to a solid measurement object 200, for example, when a structure-borne sound event occurs in the measurement object 200. A structure-borne sound event may be a transient event and may be detected as a transient event. Such a transient event may develop, for example, when a sudden structural change occurs in the measurement object 200. Examples of a sudden structural change are sudden plastic deformations, suddenly arising cracks or micro cracks and similar.

In embodiments, the optical resonator 10 may be coupled to the upper surface with the sensor region 11 oriented substantially perpendicular to an upper surface of the solid measurement object 200. According to the embodiment, the coupling of the sensor region 11 thus is performed surface-normal to the solid measurement object. This may result in improved signal quality, since a structure-borne sound event that is decisive for arising damages and the like likewise leads to a substantially perpendicular deflection of the surface.

In embodiments, the rigid coupling element 51 is arranged in the central area of the sensor region 11 of the optical resonator 10. The sensor region 11 constitutes a reflection surface for the optical resonator 10. An area of the sensor region 11 which is in the vicinity of the center point of the cavity 12 in the detection plane of the sensor region 11 is understood to be a central area. In the representation according to FIG. 1, the rigid coupling element 51 is substantially arranged in the central area of the sensor region 11.

In embodiments, the acoustic emission sensor 100 is formed to be substantially metal-free. Typically, at least the optical resonator 10 and a major part of the area of the optical waveguide 20, including a possibly present housing, are in turn formed to be metal-free. A metal-free design may be favored by the use of an appropriate material for the first coupling element 51, such as glass, for example. A substantially metal-free acoustic emission sensor 100 reduces influences that are possibly disturbing or distorting the measurement result, which are due to electromagnetic interactions. The electromagnetic compatibility of the acoustic emission sensor 100 may thereby be improved. A substantially metal-free acoustic emission sensor 100, whose measurement principle is purely optical, may likewise enable use in potentially explosive environments, such as, for example, for leak detection on gas lines or similar.

In embodiments, the acoustic emission sensor 100 furthermore includes an inertial mass 60. An inertial mass 60 is typically arranged in the area of the side of the optical resonator 10 where the optical waveguide 20 is optically coupled to the optical resonator 10. When a deflection (a compression and relaxation movement) of the sensor region 11 occurs as a consequence of a structure-borne sound event, the inertial mass 60 may contribute to dampening a movement of the optical resonator 10 as a whole. As a result, the intensity of the deflection of the sensor region 11 will increase, which improves the response sensitivity of the acoustic emission sensor 100 for structure-borne sound events in the measurement object 200.

According to an embodiment, an acoustic emission sensor 100 described herein is used for performing a measurement on a measurement object 200 in a potentially explosive environment. The optical measurement principle in the optical resonator 10 of the acoustic emission sensor 100, and possibly a metal-free design of an acoustic emission sensor 100 described herein, enable use even in a potentially explosive environment, such as, for example, on a line conducting combustible gas, or similar.

According to an embodiment, an acoustic emission sensor 100 described herein is used for performing a measurement on a measurement object 200 in a temperature range between −40° C. and +100° C. Conventional sensors may include components which are not appropriate for being used for performing a measurement in the entire scope of such a temperature range. It may be the case, for example, that such components are not high-temperature resistant, or that the conventional sensors, with regard to their measurement accuracy, are sensitive to an influence of temperature. The principle and the structure of an acoustic emission sensor 100 described herein enable use even in a temperature range of a comparatively large temperature scope of −40° C. to 100° C.

According to an embodiment, an acoustic emission sensor 100 described herein is used for performing a measurement on a measurement object 200 in a chemically corrosive environment. An example of a chemically corrosive environment includes an acidic environment having a particularly low pH value, or an alkaline environment having a particularly high pH value. Examples of a chemically corrosive environment also includes such environments or material combinations in which a conventional, non-metal-free sensor shows corrosive reaction. In particular in an acoustic emission sensor 100, that is formed to be substantially metal-free, an expansion of the application spectrum is thereby yielded.

According to an embodiment a plurality of acoustic emission sensors 100 described herein is used at a plurality of measurement points on a solid measurement object 200 for performing a measurement on the measurement object 200. The measurement includes determining a location of an acoustic event. By using a plurality of acoustic emission sensors 100 and detecting structure-borne sound events at a plurality of measurement points, damages may be localized on larger measurement objects 200, for example, which may accelerate potential maintenance or repair works.

While the embodiments of the present invention have been described above on the basis of typical exemplary embodiments, the invention is not restricted thereto but can be modified in manifold ways. The invention is neither restricted to the mentioned options of application.

The invention claimed is:

1. An acoustic emission sensor, comprising:
an optical resonator having a sensor region configured for reflective operation;
an optical waveguide which is optically coupled to the optical resonator;
a light source which is optically coupled to the optical waveguide to apply light to the optical waveguide; and
a detection device which is optically coupled to the optical waveguide to detect light from the optical resonator,
wherein the sensor region of the optical resonator comprises a coupling device for mechanically coupling to a solid measurement object,
wherein the coupling device comprises
a first coupling element for transmitting an acoustic emission signal between the sensor region and the solid measurement object, and
at least one second coupling element, wherein the at least one second coupling element is configured to at least one-of position the coupling device on the solid measurement object, or form a mechanical parallel or almost parallel connection with the first coupling element to the solid measurement object so that the at least one second coupling element acts as a filter of the transmitted acoustic emission signal.

2. The acoustic emission sensor according to claim 1, wherein the first coupling element exhibits higher rigidity than the second coupling element.

3. The acoustic emission sensor according to claim 2, wherein a relationship of a shear rigidity of the first coupling element to a shear rigidity of the at least one second coupling element at 20° C. is more than 50,000, typically more than 80,000, or more than 100,000.

4. The acoustic emission sensor according to claim 1, wherein the at least one second coupling element is arranged such that it acts mechanically in parallel to the first coupling element.

5. The acoustic emission sensor according to claim 1, wherein the first coupling element has a shape forming an approximately point-like contact area to at least one selected from the group consisting of the sensor region and the solid measurement object.

6. The acoustic emission sensor according to claim 1, wherein the optical resonator comprises a Fabry Pérot resonator.

7. The acoustic emission sensor according to claim 1, wherein the optical resonator is coupleable to an upper surface of the solid measurement object with the sensor region oriented substantially perpendicular to the upper surface of the solid measurement object.

8. The acoustic emission sensor according to claim 1, wherein the first coupling element is arranged in a central area of the sensor region.

9. The acoustic emission sensor according to claim 1, wherein the acoustic emission sensor is formed to be substantially metal-free.

10. The acoustic emission sensor according to claim 1, wherein the acoustic emission sensor furthermore comprises an inertial mass.

11. A method of using an acoustic emission sensor according to claim 1 for performing at least one selected from the group consisting of a measurement on a measurement object in a potentially explosive environment, a measurement on a measurement object in an environment having a temperature in a range between −40° C. and +100° C., and a measurement on a measurement object in a chemically corrosive environment.

12. A method of using a plurality of acoustic emission sensors according to claim 1 at a plurality of measurement points on a solid measurement object for performing a measurement on the solid measurement object, wherein the measurement comprises determining a location of a sound event.

* * * * *